US012323766B2

(12) United States Patent
Jespersgaard et al.

(10) Patent No.: US 12,323,766 B2
(45) Date of Patent: Jun. 3, 2025

(54) BINAURAL HEARING SYSTEM COMPRISING FREQUENCY TRANSITION

(71) Applicant: Oticon A/S, Smørum (DK)

(72) Inventors: Claus Forup Corlin Jespersgaard, Smørum (DK); Peter Lange, Smørum (DK)

(73) Assignee: OTICON A/S, Smørum (DK)

( * ) Notice: Subject to any disclaimer, the term of this patent is extended or adjusted under 35 U.S.C. 154(b) by 516 days.

(21) Appl. No.: 17/729,338

(22) Filed: Apr. 26, 2022

(65) Prior Publication Data

US 2022/0256296 A1 Aug. 11, 2022

Related U.S. Application Data

(63) Continuation of application No. 16/890,709, filed on Jun. 2, 2020, now Pat. No. 11,343,619.

(30) Foreign Application Priority Data

Jun. 12, 2019 (EP) .................................... 19179732

(51) Int. Cl.
*H04R 25/00* (2006.01)

(52) U.S. Cl.
CPC ......... *H04R 25/505* (2013.01); *H04R 25/552* (2013.01)

(58) Field of Classification Search
CPC ........................... H04R 25/505; H04R 25/552
(Continued)

(56) References Cited

U.S. PATENT DOCUMENTS

2009/0310805 A1 12/2009 Petroff
2011/0116666 A1 5/2011 Dittberner et al.
(Continued)

OTHER PUBLICATIONS

Launer et al., "Hearing Aids", Springer Handbook of Auditory Research, 2016, pp. 102-115, 16 total pages.
(Continued)

*Primary Examiner* — Sean H Nguyen
(74) *Attorney, Agent, or Firm* — Birch, Stewart, Kolasch & Birch, LLP

(57) ABSTRACT

A hearing system includes first and second hearing devices adapted for being located at first and second ears of a user, or for being fully or partially implanted in the head at the left and right ears of the user. The first hearing device includes a forward path having a1) an input transducer for converting a sound at the first hearing device to a first electric input signal including the sound; a processor for processing the first electric input signal, or a signal originating therefrom, and providing a first processed signal in dependence of a reduced hearing ability of the user at the first ear; an output unit adapted for providing stimuli perceivable as sound for the user at the first ear based on the first processed signal. The first hearing device further includes an analysis path having a first filter for filtering the first electric input signal and providing a first filtered signal in dependence of the reduced hearing ability of the user at the first ear; and transmitter circuitry configured to allow transmission of the first filtered signal to the second hearing device. The second hearing device includes receiver circuitry configured to allow reception of the first filtered signal from the first hearing device, and an output unit adapted for providing stimuli perceivable as sound for the user at the second ear based on the first filtered signal or a processed version thereof.

12 Claims, 12 Drawing Sheets

(58) Field of Classification Search
USPC .......................................................... 381/312
See application file for complete search history.

(56) References Cited

U.S. PATENT DOCUMENTS

| | | | | |
|---|---|---|---|---|
| 2011/0249845 | A1 | 10/2011 | Kates | |
| 2013/0243209 | A1 | 9/2013 | Zurbruegg et al. | |
| 2016/0066104 | A1 | 3/2016 | Minnaar | |
| 2017/0127200 | A1 | 5/2017 | Kuriger et al. | |
| 2017/0359660 | A1 * | 12/2017 | Nikookhoy .......... | H04R 25/305 |

OTHER PUBLICATIONS

Stephens et al., “Living With Hearing Difficulties the process of enablement”, Living With Hearing Difficulties, 2010, total 4 pages.

* cited by examiner

BINAURAL HEARING SYSTEM COMPRISING FREQUENCY TRANSITION

This application is a Continuation of copending application Ser. No. 16/890,709, filed on Jun. 2, 2020, which claims priority under 35 U.S.C. § 119(a) to application Ser. No. 19179732.3, filed in Europe on Jun. 12, 2019, all of which are hereby expressly incorporated by reference into the present application.

SUMMARY

The present disclosure deals with a binaural hearing aid system comprising left and right hearing aids adapted for being located at left and right ears of a user. Some hearing aid users are unable to hear certain frequencies, but only on one ear. The present disclosure proposes a solution to this problem.

A hearing System:

A solution to the problem is (in the present application) termed Frequency Transition. In an embodiment, frequencies that are not possible to make audible in one ear are transmitted to the hearing instrument on the other ear. In this way it is ensured that critical speech sounds and other sounds from the environment are made audible to the hearing aid user.

The solution can to some degree replace or supplement Frequency Lowering as it addresses the same fundamental problem. Frequency Transition can be preferred over Frequency Lowering as Frequency Lowering includes adding more sound within a smaller range of frequency and can change the perception of certain speech sounds. By using Frequency Transition, we apply the speech sounds in the correct frequency range, just on the other ear.

In an aspect of the present application, a hearing system comprising first and second hearing devices adapted for being located at first and second ears of a user, or for being fully or partially implanted in the head at said left and right ears of the user is provided. The first hearing device comprises

- a forward path comprising
  - a first input unit for converting a sound at said first hearing device to a first electric input signal comprising said sound;
  - a first processor for processing said first electric input signal, or a signal originating therefrom, and providing a first processed signal in dependence of a reduced hearing ability of the user at said first ear;
  - a first output unit adapted for providing stimuli perceivable as sound for the user at said first ear based on said first processed signal;
- an analysis path comprising
  - a first filter for filtering said first electric input signal and providing a first filtered signal in dependence of the reduced hearing ability of the user at said first ear;
  - a first transmitter configured to allow transmission of said first filtered signal to the second hearing device;
- the second hearing device comprising
  - a second receiver configured to allow reception of said first filtered signal from the first hearing device;
- a second output unit adapted for providing stimuli perceivable as sound for the user at said second ear comprising said first filtered signal or a processed version thereof.

Thereby an improved hearing system may be provided.

The first filter of the first hearing device may be a high-pass filter, or a low-pass filter, or a band-pass filter, depending on the reduced hearing ability of the user at said first ear. The filter may be a high-pass filter to allow frequencies above a HP-cut-off frequency ($f_{HPcut}$) to pass the filter (substantially unattenuated, or at least less attenuated than frequencies below said HP-cut-off frequency). The HP-cut-off frequency may reflect a frequency above which the user has no or little hearing ability (at the $1^{st}$ ear). It is hence intended to present the frequency content of the signal received at the (hearing impaired) first ear above the HP-cut-off frequency to the user's second (normal or less hearing impaired) ear (together with the sound that is otherwise picked up by the second ear (e.g. via direct sound reception, or via sound picked up by a microphone of the second hearing device). Alternatively, the filter may be a low-pass filter to allow frequencies below a LP-cut-off frequency ($f_{LPcut}$) to pass the filter (substantially unattenuated, or at least less attenuated than frequencies above said HP-cut-off frequency). Alternatively, the filter may be a band-pass filter to allow frequencies between first and second cut-off frequencies ($f_{BP1cut}$, $f_{BP2cut}$) to pass the filter (substantially unattenuated, or at least less attenuated than frequencies below and above said first and second cut-off frequencies, respectively).

The HP-cut-off frequency may e.g. be fixed at 1 kHz or 1.5 kHz or, preferably, adapted to the user's hearing profile, e.g. extracted during a fitting session, e.g. from an audiogram, or the like. Characteristic data of the user's hearing ability (e.g. hearing impairment), or parameters extracted from such data, at a left and/or right ear are e.g. stored in a memory of the first and/or second hearing devices (or accessible to the first and/or second hearing devices, e.g. via an auxiliary device, and/or a network). Parameters characteristic of a user's hearing ability may e.g. be derived from an audiogram (or similar data representative of a user's frequency and level dependent hearing ability), and may e.g. comprise desired frequency dependent gains at a given ear of the user, a maximum audible output frequency (MAOF), appropriate cut-off frequencies for the filter(s), appropriate frequency bands to be transposed by a frequency lowering algorithm, etc.

The second hearing device may comprise a ventilation channel, or be configured as an open fitting, allowing sound from the environment to reach the ear-drum of the user. In case the hearing ability of the user's second ear is normal, or less impaired or complementarily impaired than the user's first ear, sound reaching the second ear should preferably not be substantially attenuated by the second hearing device. It is hence advantageous, if the second hearing device is a so-called open fitting, comprising a dome or open mould structure to guide and possibly carry components of the second hearing device.

The first input unit may comprise

- at least two input transducers for providing respective at least two electric input signals,
- and a first beamformer filter for providing said first electric input signal as a beamformed signal in dependence of said at least two electric input signals.

The first input unit may comprise a noise reduction system either instead of the beamformer filter or as a postfilter to the spatially filtered (beamformed) signal provided by the beamformer filtering. The first electric input signal may thus be either a combination of signals from two or more input transducers (e.g. microphones) or a signal from a single input transducer (e.g. a microphone). The first electric input signal may have been subject to a noise reduction algorithm.

The first filter of the first hearing device may be a high-pass filter allowing frequencies above a HP-cut-off frequency ($f_{HPcut}$) to pass the filter substantially unattenuated, and wherein first hearing device further comprises a frequency lowering algorithm for making frequency content from a higher lying source frequency range available at a lower lying destination frequency range. The source and/or destination frequency ranges may be adapted to the user's hearing ability, e.g. an audiogram. The source and/or destination frequency ranges may be adapted to a maximum audible output frequency (MAOF) of the user (for the given hearing instrument), e.g. lie on each side of the MAOF. The source frequency range(s) may lie above the MAOF. The destination frequency range(s) may lie below the MAOF. The frequency lowering algorithm may include frequency compression, or frequency shifting.

The first hearing device may comprise a first signal quality estimator configured to provide an estimate of a signal quality of the first electric input signal, or of a signal derived therefrom. The first signal quality estimator may e.g. be configured to estimate a signal to noise ratio (SNR, or a similar measure of the current quality of the first electric input signal or a signal derived therefrom, e.g. the first filtered signal or a beamformed (or otherwise noise reduced) signal, in case the first hearing device (e.g. the first input unit) comprises more than one input transducer, and a beamformer filter/noise reduction system). Other signal quality estimators (than SNR) may e.g. comprise a modulation measure (e.g. modulation depth, or a speech presence probability estimator), a level estimator, etc. The signal quality estimator may e.g. rely on a multitude of sensor inputs, e.g. level detection, modulation detection, noise detection (e.g. wind noise), SNR, etc. The first hearing device may be configured to transmit a current value of the estimate of a signal quality of the first electric input signal, or of a signal derived therefrom (e.g. the first filtered signal), to the second hearing device.

The first hearing device may further comprise a controller providing a control signal for controlling the first transmitter in dependence of the estimate of a signal quality from the first signal quality estimator. The controller may e.g. be configured to disable transmission of the first filtered signal to the second hearing device in case the estimate of signal quality indicates that the signal quality is below a threshold, e.g. in case a signal-to-noise ratio is less than 0 dB, or less than −10 dB.

The second hearing device may further comprise

- a second input unit input for converting a sound at said second hearing device to a second electric input signal comprising said sound,
- a second combination unit for providing a second combined signal comprising said second electric input signal and said first filtered signal;

wherein the second hearing device is configured to allow said second output unit to provide said stimuli perceivable as sound for the user at said second ear based on said second combined signal or a processed version thereof.

The second hearing device may e.g. be configured to provide that the second combined signal is a mixture of the second electric input signal picked up by the second input unit at the second ear with the first filtered signal received from the first hearing device. The second combined signal may e.g. be a sum of the two input signals to the combination unit, or a weighted sum. The weights may e.g. be determined based on quality measures of the respective second electric input signal and the first filtered signal, e.g. so that the lower the signal quality of an input signal, the lower the weight applied to that signal.

The second hearing device may comprise a second processor for processing said combined signal and providing a second processed signal in dependence of a reduced hearing ability of the user at the second ear.

The first and or second hearing device may (each) comprise

- a signal quality estimator for providing an estimate of a signal quality of the first and/or second electric input signals and/or of filtered versions thereof, and
- a controller for estimating respective weights to be applied to an electric input signal of the hearing device in question and to a filtered electric input signal received from the other hearing device via the wireless link.

The estimate of a signal quality may e.g. be a (target) signal to noise ratio. A direction to a target signal may e.g. be determined as the look direction of the user wearing the first and second hearing devices. Alternatively, a direction to a target signal may be indicated by the user, e.g. via a user interface, e.g. an APP of a smartphone or the like.

The second hearing device may comprise

- a second filter for filtering said second electric input signal and providing a second filtered signal in dependence of a reduced hearing ability of the user at said second ear;
- a second transmitter configured to allow transmission of said second filtered signal to the first hearing device;

wherein the first hearing device comprises

- a first receiver configured to allow reception of said second filtered signal from the second hearing device;
- a first combination unit configured to provide a first combined signal comprising said first electric input signal and said second filtered signal and to feed said first combined signal or a signal originating therefrom to said first processor.

The hearing system thereby represents a binaural hearing aid system configured to allow the exchange of data, e.g. audio data (and optionally signal quality data), between each of the first and second hearing devices. The first filter and the second filter may e.g. 'represent' complementary hearing abilities of the user at the first and second ears. The first filter may e.g. be a high-pass filter (reflecting a high frequency hearing loss) and the second filter may be a low-pass filter (reflecting a low frequency hearing loss). Thereby the respective transmitted (crossed) signals may be perceived at the respective receiving ears, because of the complementary hearing loss.

In an aspect, a hearing system comprising first and second hearing devices adapted for being located at first and second ears of a user, or for being fully or partially implanted in the head at said left and right ears of the user, is provided. The first hearing device may comprise

- a forward path comprising
  - a first input transducer for converting a sound at said first hearing device to a first electric input signal comprising said sound;
  - a first processor for processing said first electric input signal, or a signal originating therefrom, and providing a first processed signal in dependence of a reduced hearing ability of the user at said first ear;
  - a first output unit adapted for providing stimuli perceivable as sound for the user at said first ear based on said first processed signal;

a first transmitter configured to allow transmission of a first exchanged signal comprising said first electric signal or a signal originating therefrom to the second hearing device.

The second hearing device may comprise a second receiver configured to allow reception of said first exchanged signal from the first hearing device and providing said first electric signal or a signal originating therefrom;

a second filter for filtering said first electric input signal or a signal originating therefrom and providing a filtered signal in dependence of the reduced hearing ability of the user at said first ear;

a second output unit adapted for providing stimuli perceivable as sound for the user at said second ear comprising said first filtered signal or a processed version thereof.

The first and second hearing devices may be constituted by or comprise first and second hearing aids, a pair of earphones, an ear protection device or a combination thereof.

The hearing system may comprise a user interface allowing a user to control functionality of the hearing system. The hearing system may be configured to allow the user to configure parameters of the frequency transition feature according to the present disclosure, including to modify a mixing ratio of signals in the first and second hearing devices. The user interface may be implemented as one or more activation elements on the first and/or second hearing devices and/or as a separate (auxiliary) device in communication with first and second hearing devices, e.g. a dedicated remote control device, or it may be implemented as an APP of a smartphone or similar device, see e.g. FIG. 6B.

The hearing system may comprise first and second hearing devices AND an auxiliary device.

The hearing system may be adapted to establish a communication link between the first and/or second hearing device and the auxiliary device to provide that information (e.g. control and status signals, possibly audio signals) can be exchanged or forwarded from one to the other.

In an embodiment, the auxiliary device comprises a remote control, a smartphone, or other portable or wearable electronic device, such as a smartwatch or the like.

The auxiliary device may be or comprise a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The hearing system may be adapted to implement a binaural hearing system, e.g. a binaural hearing aid system.

A first and/or second hearing device:

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the input signals and providing a processed output signal.

The first and second hearing device each comprises an output unit for providing a stimulus perceived by the user as an acoustic signal based on a processed electric signal. In an embodiment, the output unit comprises a number of electrodes of a cochlear implant (for a CI type hearing device) or a vibrator of a bone conducting hearing device. In an embodiment, the output unit comprises an output transducer. In an embodiment, the output transducer comprises a receiver (loudspeaker) for providing the stimulus as an acoustic signal to the user (e.g. in an acoustic (air conduction based) hearing device). In an embodiment, the output transducer comprises a vibrator for providing the stimulus as mechanical vibration of a skull bone to the user (e.g. in a bone-attached or bone-anchored hearing device).

The first (and optionally the second) hearing device comprises an input unit for providing an electric input signal representing sound. In an embodiment, the input unit comprises an input transducer, e.g. a microphone, for converting an input sound to an electric input signal. In an embodiment, the input unit comprises a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device. In an embodiment, the direct electric input signal represents or comprises an audio signal and/or a control signal and/or an information signal. In an embodiment, the hearing device comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. In an embodiment, the wireless link is established between two devices, e.g. between an entertainment device (e.g. a TV) and the hearing device, or between two hearing devices, e.g. via a third, intermediate device (e.g. a processing device, such as a remote control device, a smartphone, etc.). In an embodiment, the wireless link is used under power constraints, e.g. in that the hearing device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g.

The hearing device may comprise a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits Each audio sample is hence quantized using $N_b$ bits (resulting in $2^{Nb}$) different possible values of the audio sample). A digital sample x has a length in time of $1/f_s$, e.g. 50 μs, for $f_s$=20 kHz. In an embodiment, a number of audio samples are arranged in a time frame. In an embodiment, a time frame comprises 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the input unit, and or the antenna and transceiver circuitry comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

In an embodiment, one or more of the number of detectors operate(s) on the full band signal (time domain). In an embodiment, one or more of the number of detectors operate(s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain). In an embodiment, the level detector operates on band split signals ((time-) frequency domain).

In a particular embodiment, the hearing device comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech) originates from the voice of the user of the system. In an embodiment, a microphone system of the hearing device is adapted to be able to differentiate between a user's own voice and another person's voice and possibly from NON-voice sounds.

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

In an embodiment, the hearing device further comprises other relevant functionality for the application in question, e.g. compression, noise reduction, feedback control, etc.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the hearing assistance system comprises a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. In an embodiment, use is provided in a system comprising audio distribution. In an embodiment, use is provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A method:

In an aspect, a method of operating a hearing system comprising first and second hearing devices adapted for being located at first and second ears of a user, or for being fully or partially implanted in the head at said left and right ears of the user is furthermore provided by the present application.

The method comprises in the first hearing device:
- converting a sound at said first hearing device to a first electric input signal comprising said sound;
- processing said first electric input signal, or a signal originating therefrom, and providing a first processed signal in dependence of a reduced hearing ability of the user at said first ear;
- providing stimuli perceivable as sound for the user at said first ear based on said first processed signal;
- filtering said first electric input signal and providing a first filtered signal in dependence of the reduced hearing ability of the user at said first ear;
- transmitting of said first filtered signal to the second hearing device;
- in the second hearing device
- receiving said first filtered signal from the first hearing device;
- providing stimuli perceivable as sound for the user at said second ear comprising said first filtered signal or a processed version thereof.

It is intended that some or all of the structural features of the system or device described above, in the 'detailed description of embodiments' or in the claims can be combined with embodiments of the method, when appropriately substituted by a corresponding process and vice versa.

Embodiments of the method have the same advantages as the corresponding device or system.

A computer readable medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A computer program:

A computer program (product) comprising instructions which, when the program is executed by a computer, cause the computer to carry out (steps of) the method described above, in the 'detailed description of embodiments' and in the claims is furthermore provided by the present application.

A data processing system:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

The user interface (UI) may e.g. be configured to allow the user to select frequency transition based on a Binaural or a Monaural frequency transition (i.e. whether filtered frequency content should be transferred (crossed) from/to both hearing devices (binaural FT) or whether filtered frequency content should be transferred only from one hearing device to the other (monaural FT)).

The user interface (UI) may e.g. be configured to allow the user to configure the filter(s) of the first (and possibly second) hearing devices, e.g. to select frequency bands to be transferred to the other hearing device (and/or frequency lowered in the same hearing device).

The user interface (UI) may e.g. be configured to allow the user to configure the weighting of the local signal with the signal received from the other hearing device of the hearing system (cf. e.g. weights $w_{x1}$, $w_{x2}$, x=1, 2, in FIG. 3B or weights $w_{11}$, $w_{22}$ in FIG. 2C).

The user interface (UI) may e.g. be configured to allow the user to indicate a direction to (or a location of) a target signal source relative to the user.

Definitions:

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). In an embodiment, the hearing device comprises a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in a hearing aid system for a user with an asymmetric hearing loss.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details.

Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids in particular to a hearing system comprising first and second hearing devices, e.g. hearing aids, e.g. adapted to improve hearing perception (e.g. speech intelligibility) for a user having an asymmetric hearing impairment (i.e. different hearing loss at the two ears).

Figure 1A:
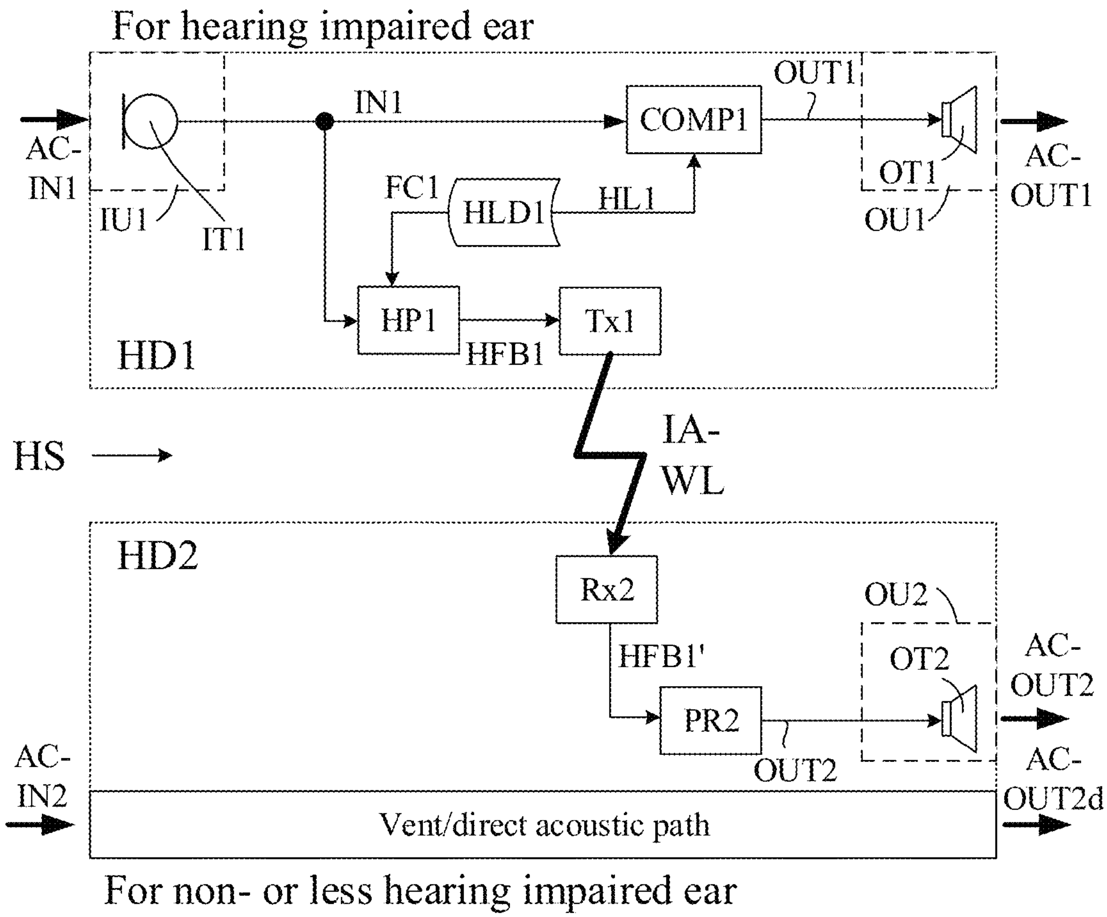
FIG. 1A shows a first embodiment of a hearing system comprising first and second hearing devices according to the present disclosure.

FIG. 1A shows a first embodiment of a hearing system comprising first and second hearing devices according to the present disclosure. The hearing system (HS) comprises first and second hearing devices (HD1, HD2) adapted for being located at first and second ears of a user, respectively, or for being fully or partially implanted in the head at said left and right ears, respectively, of the user. The first hearing device (HD1) is adapted to be located at the user's first ear (e.g. a left ear) assumed to have a reduced hearing ability (denoted 'For hearing impaired ear' in FIG. 1A, 1B, 2A, 2B). The second hearing device (HD2) is adapted to be located at the user's second ear (e.g. a right ear) assumed to have a normal or less reduced hearing ability (denoted 'For non- or less hearing impaired ear' in FIG. 1A, 1B, 2A, 2B).

The first hearing device (HD1) comprises a forward path comprising a first input unit (cf. dashed outline denoted IU1) for converting a sound (AC-IN1) at said first hearing device to a first electric input signal (IN1) comprising the sound. The (first) input unit (IU1) comprises at least one input transducer (IT1) but may additionally comprise more functional units for providing the first electric input signal IN1. The one or more functional units may e.g. comprise one or more of additional input transducer(s), e.g. microphone(s), appropriate analogue to digital conversion unit(s), an input correction unit, time domain to frequency domain converter(s), e.g. analysis filter bank(s), a beamformer (spatial filter), a noise reduction unit, etc. (see e.g. FIG. 7A, 7B). The forward path of the first hearing device (HD1) further comprises a first processor (COMP1) for processing the first electric input signal (IN1), or a signal originating therefrom, and providing a first processed signal (OUT1) in dependence of a reduced hearing ability of the user at said first ear (as e.g. derived from hearing loss data (or parameters derived therefrom, e.g. desired frequency dependent gains, of the user stored in a first memory (HLD1), cf. signal HL1 from the first memory to the first processor). The first processor (COMP1) may e.g. be configured to execute a compressive amplification algorithm and apply a frequency and level dependent gain to the first electric input signal (IN1) or a processed version thereof (to compensate for a hearing impairment of the user at the first ear). The forward path of the first hearing device (HD1) further comprises a first output unit (cf. dashed outline denoted OU1) adapted for providing stimuli perceivable as sound (AC-OUT1) for the user at the first ear (here an output transducer in the form of a loudspeaker) based on the first processed signal (OUT1). The (first) output unit (OU1) comprises an output transducer (OT1), e.g. a loudspeaker, or a vibrator of a bone conduction hearing aid, but may comprise one or more additional functional units for providing the output sound signal (AC-OUT)). The one or more functional units may e.g. comprise one or more of a frequency domain to time domain converter, e.g. a synthesis filter bank, a digital to analogue conversion unit, an output correction unit, etc. (see e.g. FIG. 7C). The first hearing device further comprises an analysis path comprising a first filter (here a high-pass filter (HP1)) for filtering the first electric input signal (IN1) and providing a first filtered signal (HFB1) in dependence of the reduced hearing ability of the user at the first ear (as e.g. derived from hearing loss data (or parameters derived therefrom, e.g. a maximum audible output frequency (MAOF)), of the user stored in a memory (HLD)). The first hearing device further comprises a first transmitter (Tx1) configured to allow transmission of the first filtered signal (HFB1) to the second hearing device (HD2). The second hearing device (HD2) comprises a second receiver (Rx2) configured to allow reception of the first filtered signal (HFB1') from the first hearing device (HD1) and an output unit (cf. dashed outline denoted OU2) adapted for providing stimuli perceivable as sound (AC-OUT2) for the user at the second ear (the second output unit here an output transducer in the form of a loudspeaker) based on the received first filtered signal HFB1' or a processed version thereof. The second output unit (OU2) comprises an output transducer (OT2), e.g. (as indicated in FIG. 1A) a loudspeaker, or a vibrator of a bone conduction hearing aid. In the embodiment of FIG. 1A, the second hearing device (HD2) further comprises a second processor (PR2) for processing first filtered signal HFB1' received from the first hearing device (HD1) and for providing a second processed signal (OUT2), e.g. in dependence of a reduced hearing ability of the user at the second ear, or to otherwise improve the signal to enhance perception of a normal hearing ear, e.g. in a noisy environment. In case the hearing ability of the user's second ear is normal, or less impaired or complementarily impaired than the user's first ear, sound reaching the second ear should preferably not be substantially attenuated by the second hearing device. It is hence advantageous, if the second hearing device comprises a large vent or is a so-called open fitting, comprising a dome or open mould structure to guide and possibly carry components of the second hearing device. In the embodiment of FIG. 1A, the second hearing device (HD2) comprises a ventilation channel (denoted 'Vent/direct acoustic path') allowing sound (AC-OUT2*d*) from the environment (AC-IN2) to reach the ear-drum of the user.

The transmitter (Tx) and receiver (Rx) of the first and second hearing devices (HD1 and HD2), respectively, are configured to establish an interaural wireless link (IA-WL) between them allowing audio to be transmitted (at least) from the first hearing device (HD1) to the second hearing device (HD2).

In the embodiment of FIG. 1A, the filter (HP1) of the first hearing device (HD1) is a high-pass filter allowing frequencies above a HP-cut-off frequency ($f_{HPcut}$) to pass the filter unattenuated. The HP-cut-off frequency may reflect a frequency above which the user has no or little hearing ability (at the $1^{st}$ ear), e.g. the maximum audible output frequency (MAOF), e.g. stored in the first memory (HLD1), cf. signal FC1 from the memory to the high-pass filter (HP1). Using the wireless link (IA-WL), the frequency content of the signal received at the (hearing impaired) first ear above the HP-cut-off frequency is transmitted to the user's second (e.g. normal) ear and presented there by the output transducer (OT2) of the second hearing device as sound (AC-OUT2). In addition, environment sound (AC-IN2) at the second ear is propagated through the direct acoustic path (e.g. of a ventilation channel or an open fitting) and reaches the ear drum (AC-OUT2*d*), where it is mixed with the sound (AC-OUT2) from the output transducer (OT2).

Figure 1B:
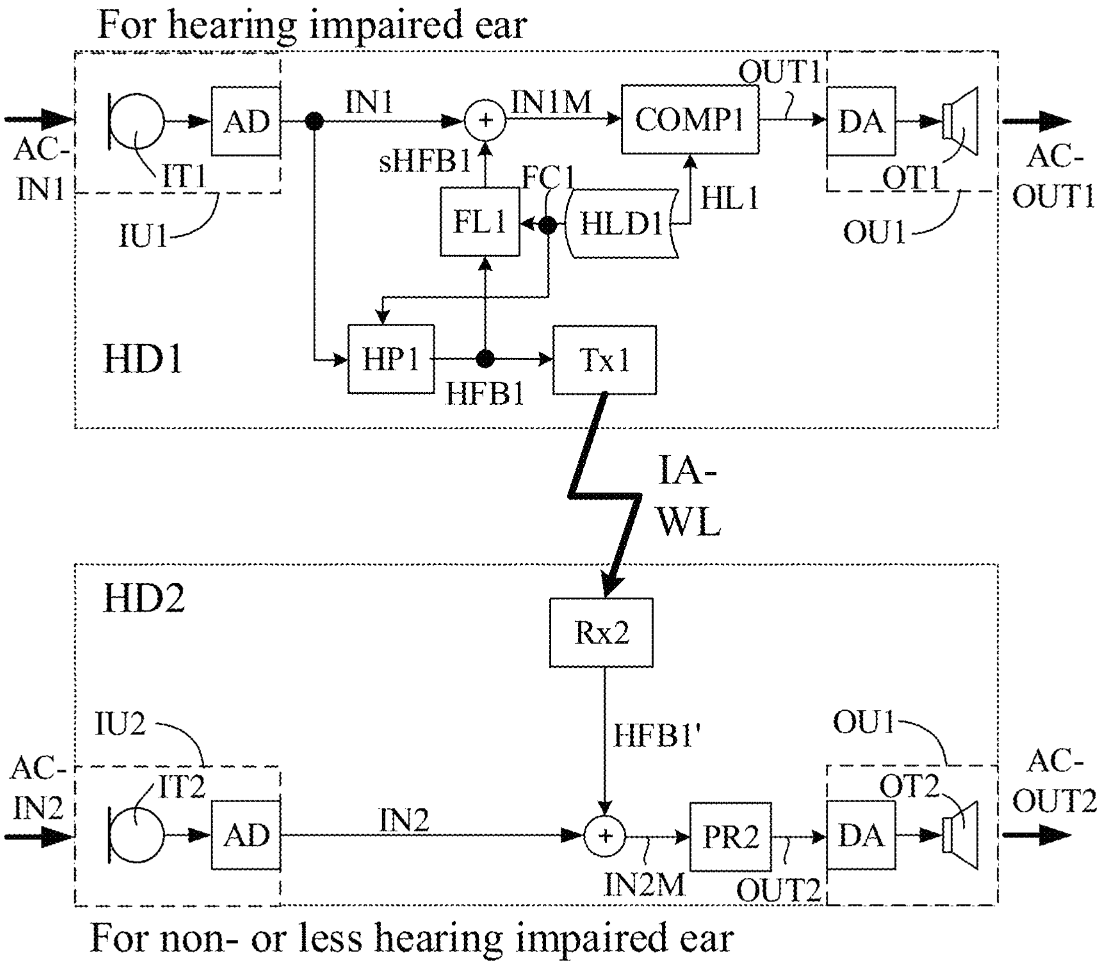
FIG. 1B shows a second embodiment of a hearing system comprising first and second hearing devices according to the present disclosure.

FIG. 1B shows an embodiment of a hearing system (HS) comprising first and second hearing devices according to the present disclosure as illustrated in FIG. 1A, but where the first and second hearing devices comprises further functional components compared to the embodiments of FIG. 1A.

In the embodiment of FIG. 1B, the first hearing device (HD1) comprises a first frequency lowering unit (FL1) for making frequency content in a (source) frequency range above a threshold frequency (fm, e.g. the maximum audible output frequency (MAOF)) available to the user in a lower (destination) frequency range (or band). Such algorithm is e.g. described in US20170127200A1, and illustrated in FIG. 4, see description below. In the embodiment of FIG. 1B, the frequency lowered content (sHFB1) is combined with the electric input signal IN1 in a combination unit (here a sum unit '+') to provide a modified first electric input signal (IN1M) comprising high frequency-content of the first electric input signal shifted to lower frequencies (to make such content available in a frequency range of (aided) hearing ability of the user at the first ear). The modified electric input signal (IN1M) is fed to the processor (COMP1) for amplification and possible other processing according to the needs of the user. In this case, high frequency content of the first electric input signal is made available to the user at both ears. The frequency bands that are transferred from the first hearing device to the second hearing device, may be identical to the frequency bands that are shifted to lower frequencies by the frequency lowering algorithm (FL1) of the first hearing device. Alternatively, they may be overlapping or NOT overlapping (complementary). Such source and destination frequency bands for a frequency lowering algorithm (FL1) and the cut-off frequency for the high-pass filter (HP1) may be determined in dependence of a user's hearing profile and stored in the first memory (HLD1) of the first hearing device (HD1), cf. signal FC1.

The first input and output units (IU1, OU1) of the first hearing device (HD1) further comprises appropriate analogue to digital (AD) and digital to analogue (DA) converters to enable digital signal processing.

In the embodiment of FIG. 1B, the second hearing device (HD2) further comprises an input unit (IU2) comprising input transducer (IT2) and analogue to digital converter (AD) for converting a sound (AC-IN2) at said second hearing device to a second (digitized) electric input signal (IN2) comprising the sound. The second electric input signal (IN2) is fed to a combination unit ('+'), here a SUM-unit, wherein the second electric input signal (IN2) is mixed with (here added to) the filtered signal (HFB1') comprising high frequency content of the first electric signal (IN1) received from the first hearing device by wireless receiver (Rx2) of the second hearing device. The resulting mixed signal, modified second electric input signal (IN2M), is fed to the processor (PR2) providing processed signal OUT2 that is presented to the user at the second ear. The second output unit (OU2) comprises a digital to analogue converter (DA) and an output transducer (OT, here a loudspeaker). The input unit (IU2), combination unit (+), processor (PR2) and output unit (OU2) form part of a forward path of the second hearing device from audio input (AC-IN2) to audio output (AC-OUT2). Thereby the environment sound at the second ear is picked up by the second hearing device, mixed with HF-content from the first ear, processed, and presented to the user at the second ear. In the embodiment of FIG. 1A, the sound at the second ear was only presented at the ear drum of the second ear via directly, acoustically propagated sound (e.g. through a vent or other open structure of the second hearing device).

The input and output units of the embodiments of the first and second hearing devices of FIG. 1B comprise appropriate analogue to digital (AD) and digital to analogue converters (DA), respectively, to specifically indicate that signal processing in the hearing devices is performed in the digital domain. The AD- and DA converters may e.g. form part of the forward paths of the first (and second) hearing device(s). The processing may further be fully or partially performed in the frequency domain. If this is the case, appropriate filter banks are included, i.e. respective analysis filter banks (FBA) on the input side (e.g. in the input units) (to convert a time domain input signal to a multitude of frequency sub-band signals) and respective synthesis filter banks (FBS) on the output side (e.g. in the output units) (to provide the output signal in the time domain), cf. e.g. FIG. 7A, 7B. The filter banks may e.g. form part of the forward path(s) of the first (and second) hearing device(s).

Figure 2A:
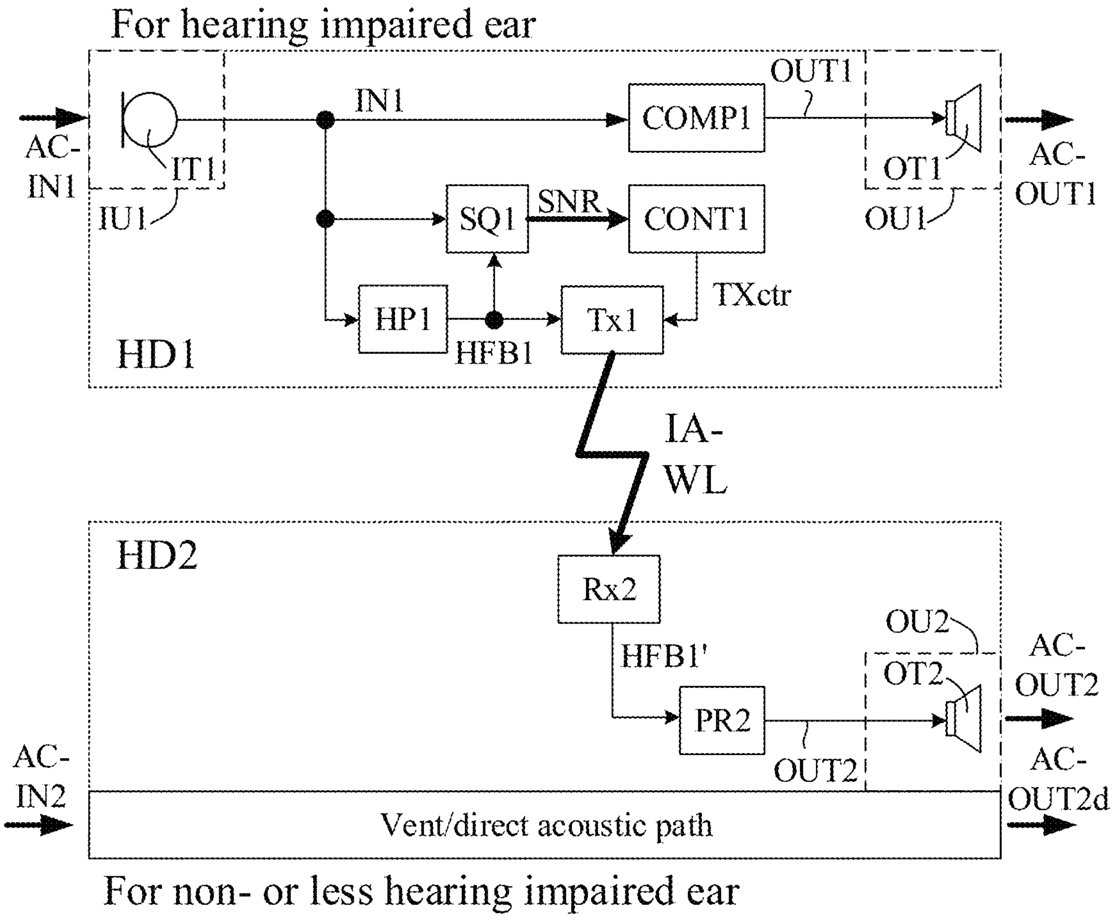
FIG. 2A shows a third embodiment of a hearing system comprising first and second hearing devices according to the present disclosure.

FIG. 2A shows an embodiment of a hearing system (HS) comprising first and second hearing devices according to the present disclosure as illustrated in FIG. 1A, but where the first hearing device (HD1) comprises further functional components compared to the embodiment of FIG. 1A.

In the embodiment of FIG. 2A, the first hearing device (HD1) comprises a first signal quality estimator (SQ1) configured to provide an estimate (cf. signal SNR) of a signal quality (e.g. an SNR) of the first electric input signal (IN1), or a signal derived therefrom. In the embodiment of FIG. 2A, the signal quality estimator (SQ) receives the first electric input signal (IN1) as well as the filtered signal (HFB1). The signal quality estimator may alternatively or additionally receive as an input a beamformed signal, in case the first hearing device comprises more than on input transducer, and a beamformer filter (cf. e.g. FIG. 7A, 7B). The signal quality estimator (SQ1) may be configured to provide an estimate of a signal quality of at least one of the signal inputs, or of both (or all, cf. bold arrow denoted SNR from unit SQ1 to unit CONT1) and to provide separate signal quality estimates, which can be used to qualify a decision of whether or not to transfer the filtered signal (HFB1) to the other hearing device at a given point in time. The signal quality estimator (SQ1) may e.g. rely on a multitude of sensor inputs, e.g. level detection, modulation detection, noise detection (e.g. wind noise), SNR, etc. The signal quality estimate(s) (SNR) is(are) fed to a controller (CONT1) providing a control signal (TXctr) for controlling the transmitter (Tx) in dependence of the signal quality estimate(s) (SNR). The controller (CONT1) may e.g. be configured to disable transmission of the first filtered signal (HFB1) in case the signal quality estimator (SNR) indicates that the signal quality is below a threshold value. Thereby it can be ensured that the frequency transition is only performed when it has a potential to improve the overall perception of the current sound filed around the user (with respect to a target signal, e.g. a speech signal). Alternatively or additionally, the 'local' and 'remote' signals may be mixed according to a weighting scheme, e.g. based on the respective signal qualities (e.g. SNR, cf. signal SNR1 from signal quality estimator SQ1 to controller CONT1) to give a higher weight to a signal with a relatively high signal quality and a lower weight to a signal with a relatively low signal quality (cf. e.g. FIG. 3B). Thereby, also power may be saved (by disabling transmission in low quality sound situations). In the embodiment of the first hearing device (HD1) shown in FIG. 2A, the memory (HLD1) comprising hearing loss data (or parameters derived therefrom) is not shown, but is implicit in the user specific filter (HP1, e.g. its cut-off frequency) and processor (COMP1, e.g. its compression algorithm). In the embodiment of FIG. 2A, the second hearing device (HD2) is shown to be identical to the embodiment of FIG. 1A, as described above.

Figure 2B:
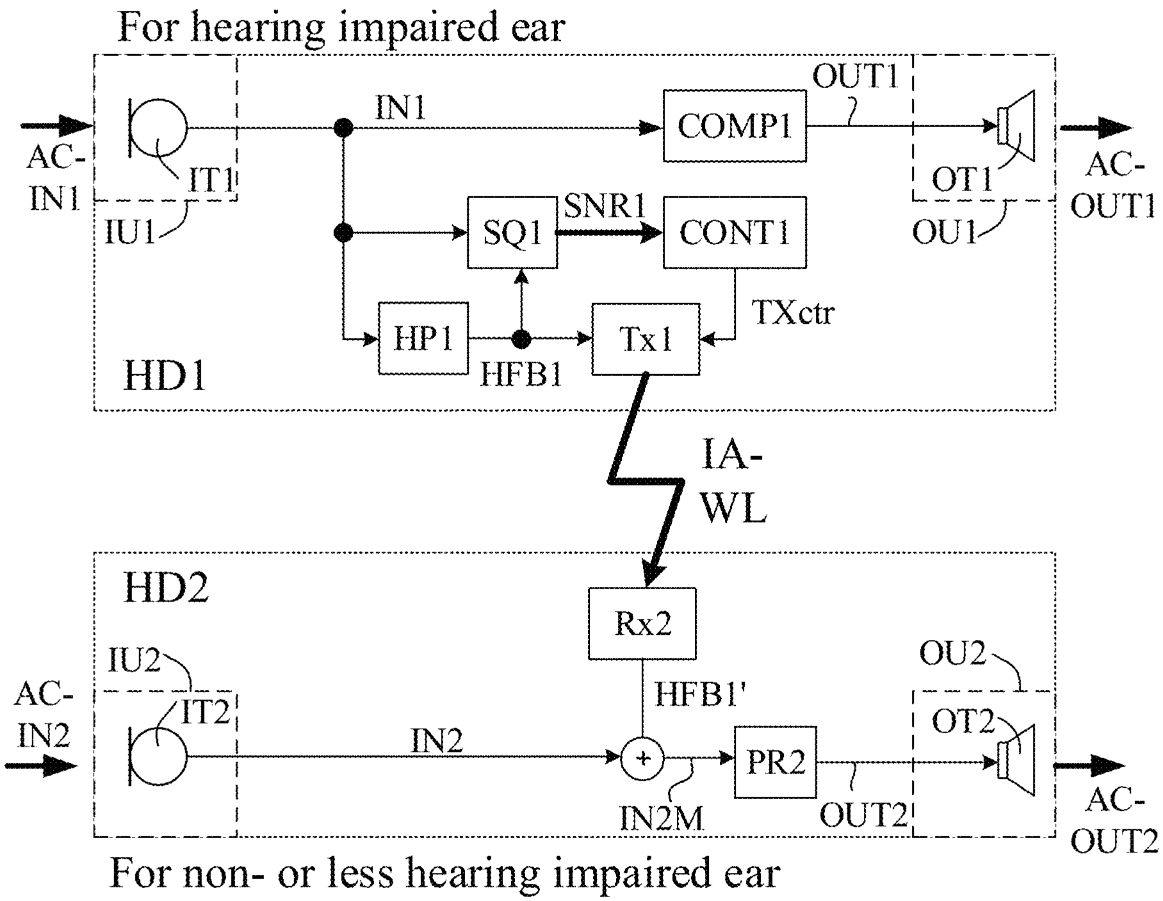
FIG. 2B shows a fourth embodiment of a hearing system comprising first and second hearing devices according to the present disclosure.

In the embodiment of FIG. 2B, the first hearing device (HD1) is identical to the embodiment of FIG. 2A, and the second hearing device is (nearly) identical to the embodiment of FIG. 1B.

Compared to the embodiments of FIG. 1B, the embodiments of FIGS. 2A and 2B are not shown to include appropriate analogue to digital and digital to analogue converters. Such units are assumed to be included as necessary for the implementation ins question.

Figure 2C:
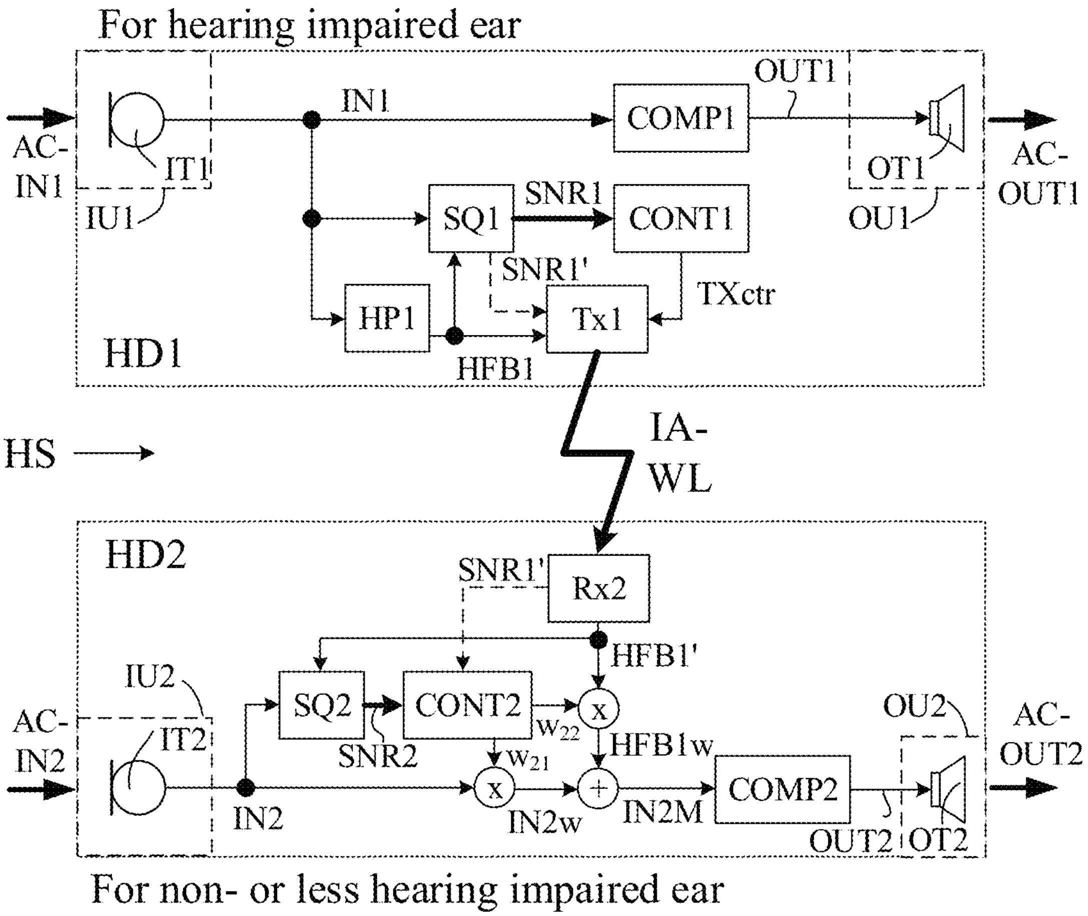
FIG. 2C shows a fifth embodiment of a hearing system comprising first and second hearing devices according to the present disclosure.

FIG. 2C shows a further embodiment of a hearing system (HS) comprising first and second hearing devices (HD1, HD2) according to the present disclosure. The embodiment of FIG. 2C is similar to the embodiment of FIG. 2B, but the second hearing device (HD2) of FIG. 2C additionally comprises combination units ('x') in the signal paths of the second electric input signal (IN2) and the filtered first electric input signal (HFB1') received from the first hearing device (HD1) to enable application of respective weights $w_{21}$ and $w_{22}$, provided by (second) controller CONT2, to these signals. In the embodiment of FIG. 2C, the second hearing device (HD2) comprises a (second) signal quality estimator (SQ2) receiving as inputs the second electric input signal (IN2) and the filtered first electric input signal (HFB1') and providing as output (SNR2) signal quality estimates of the respective input signals (here SNRs of signals IN2 and HFB1', cf. bold arrow SNR2 to controller CONT2). In an embodiment, the signal quality estimate (SNR1) of the first electric input signal (IN1) and/or of the first filtered signal (HFB1) is(are) transmitted (e.g. via the wireless link IA-WL) from the first to the second hearing device, cf. dashed arrows denoted SNR1' in the first hearing device (from SQ1 to Tx1) and in the second hearing device (from Rx2 to CONT2). This may e.g. be instead of estimating the signal quality of the first filtered signal (HFB1'1) in signal quality estimator (SQ2) of the second hearing device (HD2). Thereby a continuous weighting scheme (controlled by SNR-estimates) for presenting a useful signal at the user's second ear may be provided. A given weight may generally increase with increasing estimate of signal quality (e.g. SNR), e.g. within an active range or monotonically (e.g. represented by a sigmoid (or similar) function). The weights may be normalized (so that $w_{12}+w_{22}=1$). At the same time, the transmission of the first filtered signal (HFB1) from the first to the second hearing device may be controlled to be only made when the signal quality of the filtered signal is estimated to be of value for the user (as described in connection with FIG. 2B). In an embodiment, the weights may be influenced or determined from a user interface, e.g. a remote control device (e.g. from an APP of a smartphone, or the like).

Figure 3A:
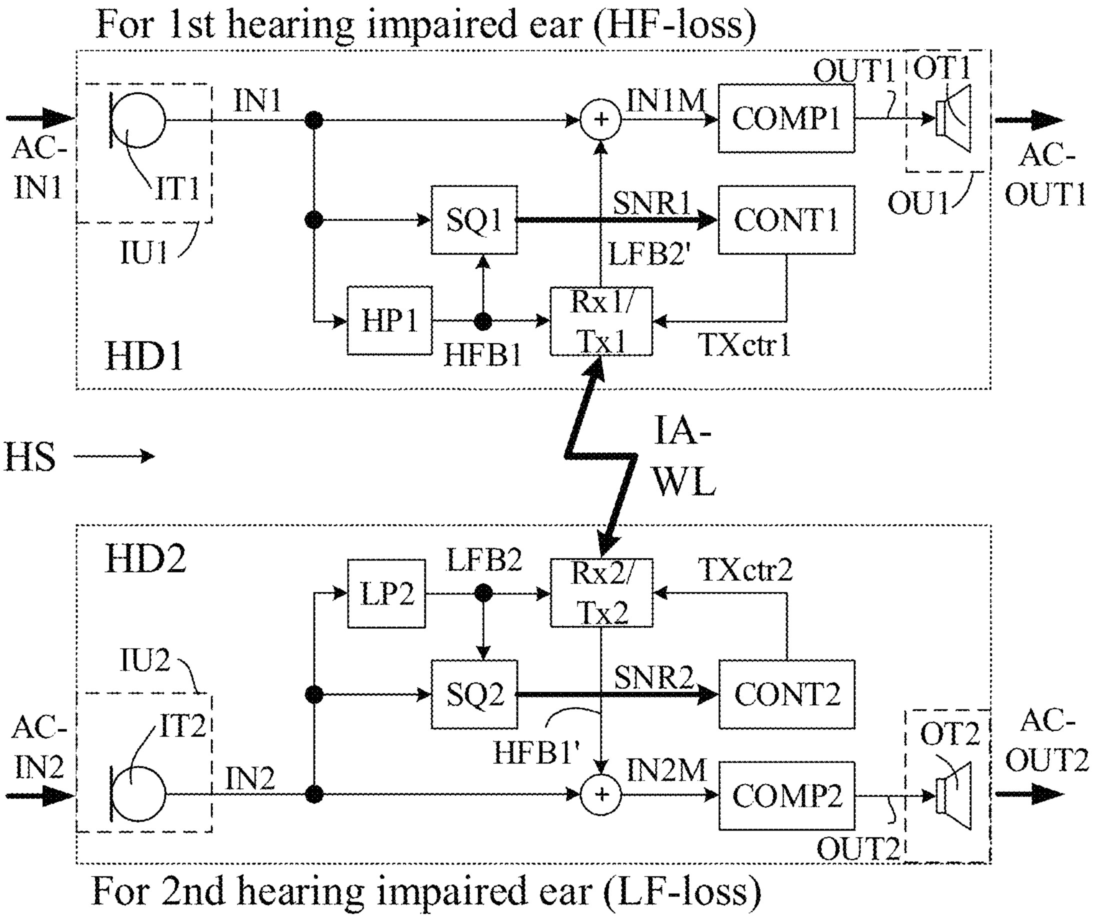
FIG. 3A shows a first embodiment of a binaural hearing system comprising first and second hearing devices comprising a first signal quality dependent frequency transition scheme according to the present disclosure.

FIG. 3A shows an embodiment of a binaural hearing system (HS) comprising first and second hearing devices (HD1, HD2), each comprising a signal quality dependent frequency transition scheme according to the present disclosure. The first and second hearing devices are structurally identical and resemble the embodiment of the first hearing device (HD1) of the embodiment of FIGS. 2A and 2B. A difference is that the first and second hearing devices (HD1, HD2) of FIG. 3A each comprises transceiver circuitry (Rx1/Tx1 and Rx2/Tx2, respectively) allowing to establish a bi-directional wireless link (IA-WL) between the two hearing devices (e.g. via an intermediate relay or processing device), cf. bold, double arrow denoted IA-WL in FIG. 3A. The first hearing device (HD1) is adapted to be located at the user's first ear (e.g. a left ear) assumed to have a first reduced hearing ability (denoted 'For 1$^{st}$ hearing impaired ear (HF-loss)' in FIG. 3A). The second hearing device (HD2) is adapted to be located at the user's second ear (e.g. a right ear) assumed to have a second reduced hearing ability (denoted 'For 2$^{nd}$ hearing impaired ear (LF-loss)' in FIG. 3A).

The (second) filter (LP2) of the second hearing device (HD2) is configured to filter the second electric input signal (IN2) and to provide a second filtered signal (LFB2) in dependence of a reduced hearing ability of the user at the second ear. The second hearing device (HD2) further comprises (second) transmitter circuitry (Tx2) configured to allow transmission of said second filtered signal (LFB2) to the first hearing device (HD1). The first hearing device (HD1) hence comprises (first) receiver circuitry (Rx1) configured to allow reception of the second filtered signal (LFB2') from the second hearing device (HD2) and a first combination unit ('+') configured to provide a first combined signal (IN1M) comprising the first electric input signal (IN1) and the second filtered signal (LFB2'). The first hearing device (HD1) is further configured to feed the first combined signal (IN1M) or a signal originating therefrom to the first processor (COMP1) for processing according to the user's needs (as previously described) and for subsequent presentation of the processed signal (OUT1) at the first ear of the user via first output transducer (loudspeaker) (OT1) as an acoustic signal (AC-OUT1).

The same structure is implemented in the first and second hearing devices (HD1, HD2) allowing transmission of the filtered signal (HFB1) from the first to the second hearing device and for combining it with the second electric input signal (IN2) picked up by the second input transducer (microphone) (IT2) to provide combined signal IN2M, processing of the combined signal IN2M by second processor (COMP2) according to the needs of the user's second ear and presenting the processed signal OUT2 to the user via second output transducer (loudspeaker) (OT2) as an acoustic signal (AC-OUT2).

As described for the first hearing device (HD1) of the embodiment of FIG. 2A, both hearing devices (HD1, HD2) of the embodiment of FIG. 3A comprise a signal quality estimator (SQ1, SQ2, respectively) whose output (SNR1, SNR2) is fed to a controller (CONT1, CONT2) controlling the respective transmitters (Tx1, Tx2) in dependence of the respective control signals (TXctr1, TXctr2).

The hearing system thereby represents a binaural hearing aid system configured to allow the exchange of data, e.g. audio data, between each of the first and second hearing devices. The first filter and the second filter may e.g. 'represent' complementary hearing abilities of the user at the first and second ears. The first filter may e.g. be a high-pass filter ((HP1) reflecting a high frequency hearing loss) and the second filter may be a low-pass filter ((LP2) reflecting a low frequency hearing loss). Thereby the respective transmitted (crossed) signals may be perceived at the respective receiving ears, because of the complementary hearing loss.

Figure 3B:
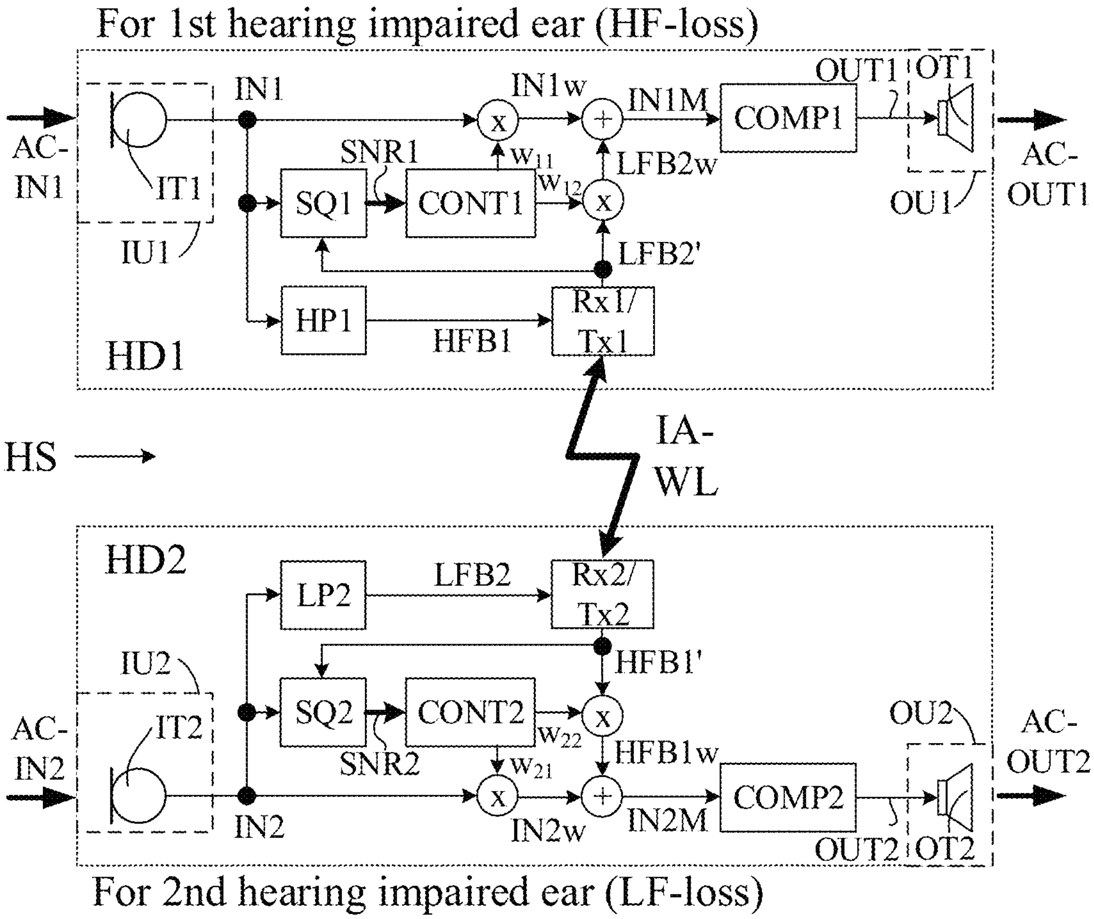
FIG. 3B shows a second embodiment of a binaural hearing system comprising first and second hearing devices comprising a second signal quality dependent frequency transition scheme according to the present disclosure.

FIG. 3B shows a second embodiment of a binaural hearing system (HS) comprising first and second hearing devices (HD1, HD2) comprising a second signal quality dependent frequency transition scheme according to the present disclosure. The embodiment of FIG. 3B is largely identical to the embodiment of FIG. 3A but comprises a signal quality dependent weighting scheme to optimize a mixture of the local electric input signal with the remote (filtered) electric input signal to be presented to the user at the ear in question via the output unit (OUx, x=1, 2). The weighting scheme of the first and second hearing devices is described in connection with FIG. 2C above.

The embodiment of FIG. 3B may be combined with the embodiment of FIG. 3A, so that below a predefined threshold quality of the electric input signal (or the filtered signal) no transmission to the other hearing device is performed (as in FIG. 3A), whereas the weighting scheme of FIG. 3B is used (and exchange of signals performed) when the signal quality estimate is above the predefined threshold quality. In an embodiment, a signal quality estimate (SNR1, SNR2) of the electric input signal (or the filtered signal) of a given hearing device (HD1, HD2) is transmitted to the other hearing device (HD2, HD1) (e.g. instead of making an estimate of the signal quality of the (filtered) signal received from the other hearing device (signals HFB1' and LFB1' in HD2 and HD1, respectively), as proposed in the embodiment of FIG. 3B).

Figure 4:
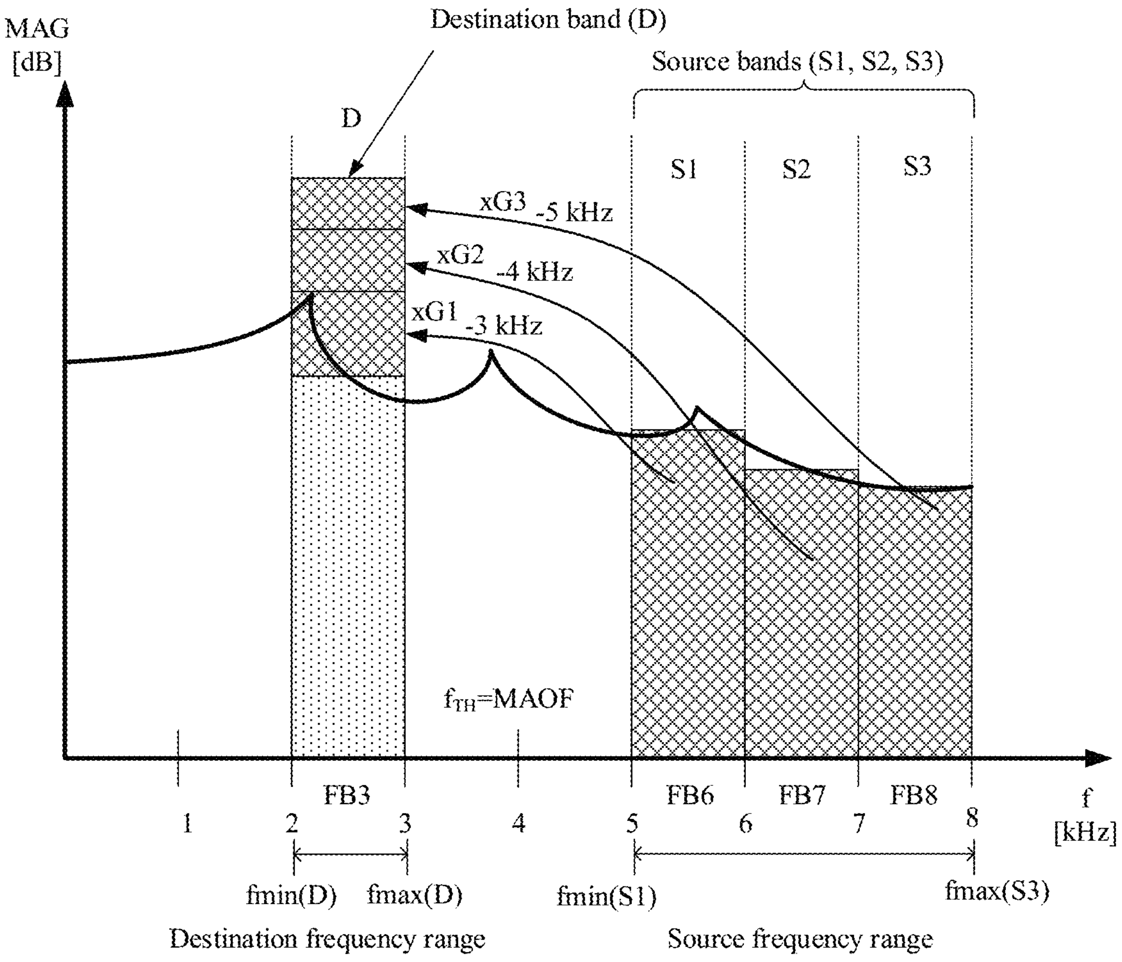
FIG. 4 shows an exemplary frequency transposition scheme for a hearing device according to the present disclosure, FIG. 5A schematically shows a BTE/RITE style hearing device according to a first embodiment of the present disclosure, and FIG. 5B schematically shows a BTE/ear mould style hearing device according to a second embodiment of the present disclosure.

FIG. 4 shows an exemplary frequency transposition scheme for a hearing device according to the present disclosure. The purpose of the frequency transposition is to replace some signal energy at a higher frequency into a lower frequency. This can e.g. be implemented by providing multiple negative frequency shifts, e.g. Δf1 (e.g. −1 kHz), Δf2 (e.g. −2 kHz), Δf3 (e.g. −3 kHz), to a number (e.g. three) of source frequency bands S1, S2, S3 of an input signal. The purpose of this operation is to make high frequency sounds (otherwise not audible) audible to the user. In the embodiment of FIG. 4, a relatively wider source frequency range (e.g. comprising source bands S1, S2, S3, e.g. band 6, 7, 8 in FIG. 4, at 5-8 kHz, 6-7 kHz and 7-8 kHz, respectively) at relatively higher frequencies is compressed to a relatively narrower destination frequency range/band (D, e.g. band 3 at 2-3 kHz in FIG. 4). To bring the high frequency content of the source bands (S1, S2, S3) into the destination band (D, FB3 between 2 and 3 kHz), different frequency shifts Δfj, j=1, 2, 3 must be applied to the different source bands Sj, j=1, 2, 3. In the example of FIG. 4, the frequency band FB6 between 5 and 6 kHz will be shifted by −3 kHz; the frequency band FB7 between 6 and 7 kHz will be shifted by −4 kHz; and the frequency band FB8 between 7 and 8 kHz will be shifted by −5 kHz. The differently shifted signals are added together (possibly scaled with a gain factor Gj, j=1, 2, 3). It also has to be pointed out, that not the whole high frequency part (above a frequency threshold frH, here 4 kHz) is not necessarily shifted. The scaling factors may e,g, be determined according a signal quality measure (e.g. SNR) of the frequency band in question. In an embodiment, only a region or regions with specific information of interest to the user, e.g. information related speech intelligibility, such as significant information about fricative consonants (T, s'), e.g. the frequency bands between 5 kHz and 8 kHz is shifted (lowered, transposed). The HF-content (above frH) of the source bands (S1, S2, S3) is scaled (attenuated) AND mixed (added up) with the LF-content (below frH) of the destination band (D). The LF-content in this situation means the original (un-transposed) signal content. In an embodiment, where frequency compression/lowering is enabled, the original part of the output signal is maintained in the destination band (D), to which additional (shifted, possible scaled) signal content of the source band(s) (S1, S2, S3) is added.

In an embodiment, only the magnitude is transposed from source to destination bands. In an embodiment, the phase of the destination band is maintained as the resulting phase of the modified destination band. Another number of source frequency bands (e.g. one or two, or more than three) may be copied or moved to one or more destination bands (possibly in a scaled form) and added to or replacing the original content of the source band(s) in question.

In the example of FIG. 4, frequency compression is provided. In other examples, only frequency shifting (no compression) is enabled. In still other examples, frequency expansion is provided (moving or copying content of a higher lying (narrow) source frequency range or band to lower lying (broader) destination frequency range or band.

Frequency compression will typically be enabled for users with a strong HF-Hearing Loss. Once enabled, the frequency compression is intended to work continuously. The frequency transposition can be enabled by the fitting software (e.g. running on the programming device). It is possible to have different frequency transpositions in different programs (different shifts, frequency transposition being on or off, etc.). For a given program, where frequency transposition is enabled, it is in specific embodiments 'always on', independent of acoustic environment/signal content (not dynamically determined). Thereby an increased ability to hear sounds (e.g. alarms or other HF-sounds or speech) is provided.

Figure 5A:
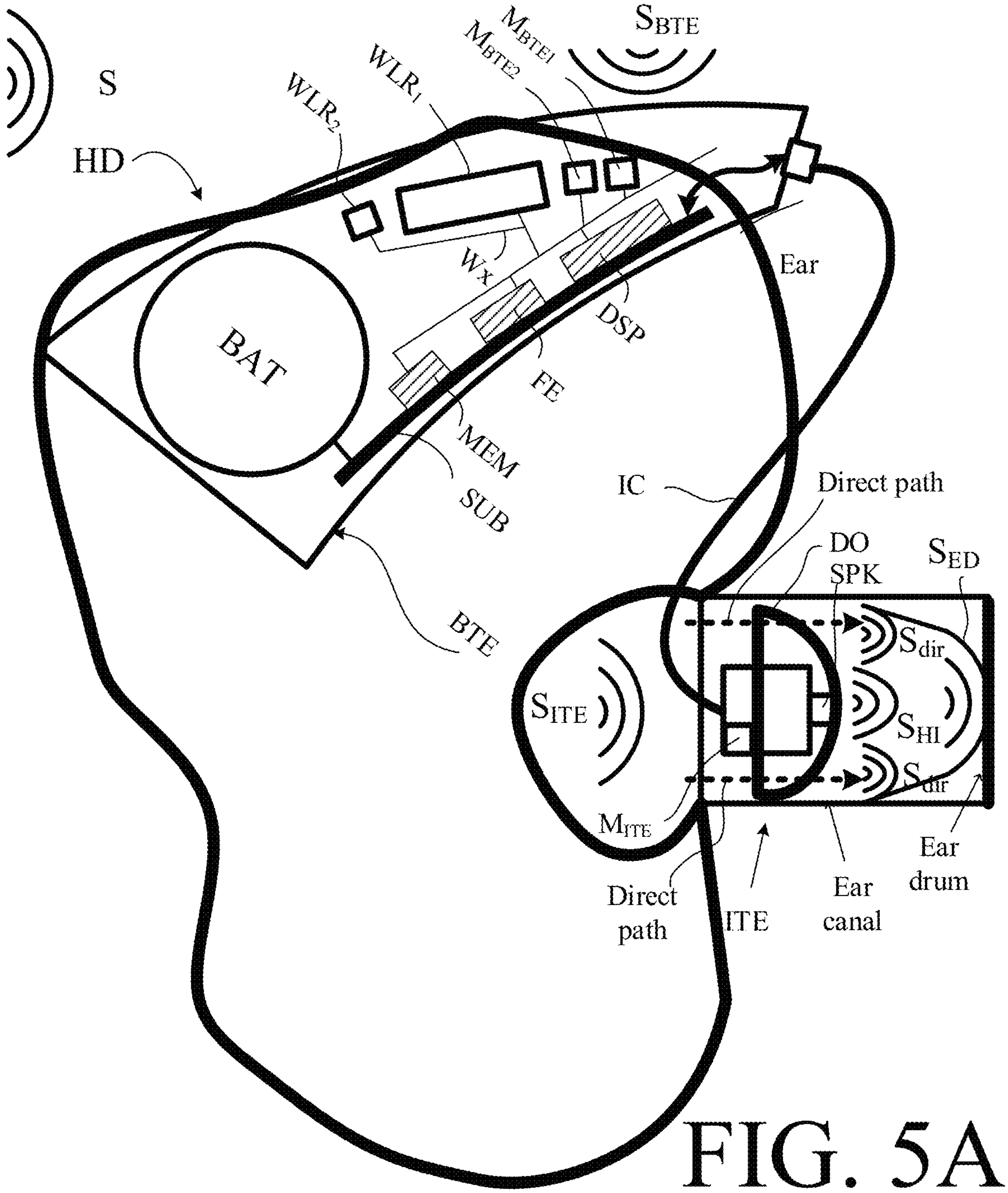
Figure 5B:
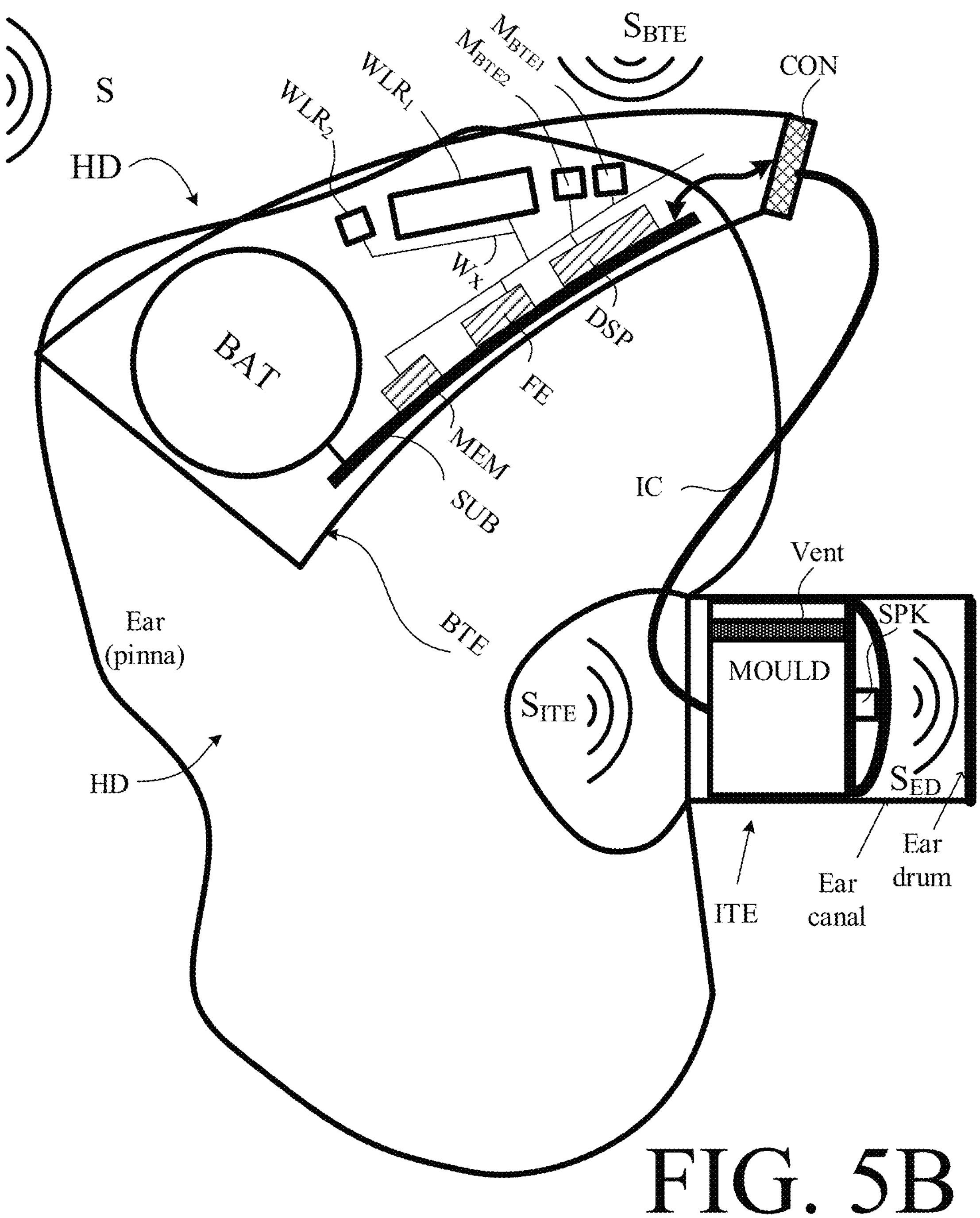

FIG. 5A shows a BTE/RITE style hearing device according to a first embodiment of the present disclosure. The exemplary hearing device (HD), e.g. a hearing aid, is of a particular style (sometimes termed receiver-in-the ear, or RITE, style) comprising a BTE-part (BTE) adapted for being located at or behind an ear of a user, and an ITE-part (ITE) adapted for being located in or at an ear canal of the user's ear and comprising a receiver (loudspeaker). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts. Other styles, e.g. comprising a custom mould adapted to a user's ear and/or ear canal, may of course be used. FIG. 5B schematically shows a BTE/ear mould style hearing device according to a second embodiment of the present disclosure.

In the embodiment of a hearing device in FIGS. 5A and 5B, the BTE part comprises an input unit comprising two input transducers (e.g. microphones) ($M_{BTE1}$, $M_{BTE2}$), each for providing an electric input audio signal representative of an input sound signal (SBTE) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device, or a telephone). The hearing device (HD) comprises a substrate (SUB) whereon a number of electronic components are mounted, including a memory (MEM), e.g. storing different hearing aid programs (e.g. user specific data, e.g. related to an audiogram, or parameter settings derived therefrom, e.g. defining such (user specific) programs, or other parameters of algorithms) and/or hearing aid configurations, e.g. input source combinations ($M_{BTE1}$, $M_{BTE2}$ ($M_{ITE}$), $WLR_1$, $WLR_2$), e.g. optimized for a number of different listening situations. In a specific mode of operation, two or more of the electric input signals from the microphones are combined to provide a beamformed signal provided by applying appropriate complex weights to (at least some of) the respective signals.

The substrate (SUB) further comprises a configurable signal processor (DSP, e.g. a digital signal processor), e.g. including a processor for applying a frequency and level dependent gain, e.g. providing beamforming, noise reduction, filter bank functionality, and other digital functionality of a hearing device, e.g. implementing a filter, frequency lowering, signal quality estimation unit, etc., according to the present disclosure (as e.g. discussed in connection with FIGS. 1A, 1B, 2A, 2B, and 3). The configurable signal processor (DSP) is adapted to access the memory (MEM) e.g. for selecting appropriate parameters for a current configuration or mode of operation and/or listening situation. The configurable signal processor (DSP) is further configured to process one or more of the electric input audio signals and/or one or more of the directly received auxiliary audio input signals, based on a currently selected (activated) hearing aid program/parameter setting (e.g. either automatically selected, e.g. based on one or more sensors, or selected based on inputs from a user interface). The mentioned functional units (as well as other components) may be partitioned in circuits and components according to the application in question (e.g. with a view to size, power consumption, analogue vs. digital processing, acceptable latency, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals (e.g. interfaces to microphones and/or loudspeaker(s)). The input and output transducers may be individual separate components, or integrated (e.g. MEMS-based) with other electronic circuitry.

The hearing device (HD) further comprises an output unit (e.g. an output transducer) providing stimuli perceivable by the user as sound based on a processed audio signal from the processor or a signal derived therefrom. In the embodiment of a hearing device in FIG. 5A, the ITE part comprises the output unit in the form of a loudspeaker (also termed a 'receiver') (SPK) for converting an electric signal to an acoustic (air borne) signal, which (when the hearing device is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. The ITE-part further comprises a further input transducer, e.g. a microphone ($M_{ITE}$), for providing an electric input audio signal representative of an input sound signal ($S_{ITE}$) at the ear canal. Propagation of sound ($S_{ITE}$) from the environment to a residual volume at the ear drum via direct acoustic paths through the semi-open dome (DO) are indicated in FIG. 5A by dashed arrows (denoted Direct path). The direct propagated sound (indicated by sound fields $S_{dir}$) is mixed with sound from the hearing device (HD) (indicated by sound field $S_{HI}$) to a resulting sound field ($S_{ED}$) at the ear drum. The ITE-part may comprise a (possibly custom made) mould for providing a relatively tight fitting to the user's ear canal. The mould may comprise a ventilation channel (cf. e.g. HD2 in FIG. 1A) to provide a (controlled) leakage of sound from the residual volume between the mould and the ear drum (to manage the occlusion effect).

The electric input signals (from input transducers $M_{BTE1}$, $M_{BTE2}$, $M_{ITE}$) may be processed in the time domain or in the (time-) frequency domain (or partly in the time domain and partly in the frequency domain as considered advantageous for the application in question).

The embodiment of FIG. 5B schematically shows a BTE/ear mould style hearing device (HD) is similar to the embodiment of FIG. 5A. Only the ITE-part is slightly different in that it (instead of an open dome-like structure comprises a (possibly) custom made ear mould (MOULD) comprising a ventilation channel (Vent) to minimize the occlusion effect. In the embodiment of FIG. 5B, no microphone is indicated to be present on the ITE-part. The embodiment of FIG. 5B may be more suited (than the embodiment of FIG. 5A) for compensation of a higher hearing loss (e.g. severe to profound). In the embodiment of FIGS. 5B (and 5A), the connecting element (IC) comprises electric conductors for connecting electric components of the BRE and ITE-parts. The connecting element (IC) of FIG. 5B comprises matching connectors (CON) to attach the cable (IC) to the BTE-part. In an embodiment, the connecting element (IC) is an acoustic tube and the loudspeaker (SPK) is located in the BTE-part. In a still further embodiment, the hearing device comprises no BTE-part, but the whole hearing device is housed in the ear mould (ITE-part).

The embodiments of a hearing device (HD) exemplified in FIGS. 1A, 1B, 2A, 2B, 3 and 5A, 5B are portable devices comprising a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression) of one or more frequency ranges to one or more other frequency ranges, e.g. to compensate for a hearing impairment of a user. The BTE-part may e.g. comprise a connector (e.g. a DAI or USB connector) for connecting a 'shoe' with added functionality (e.g. an FM-shoe or an extra battery, etc.), or a programming device, or a charger, etc., to the hearing device (HD).

Figure 6A:
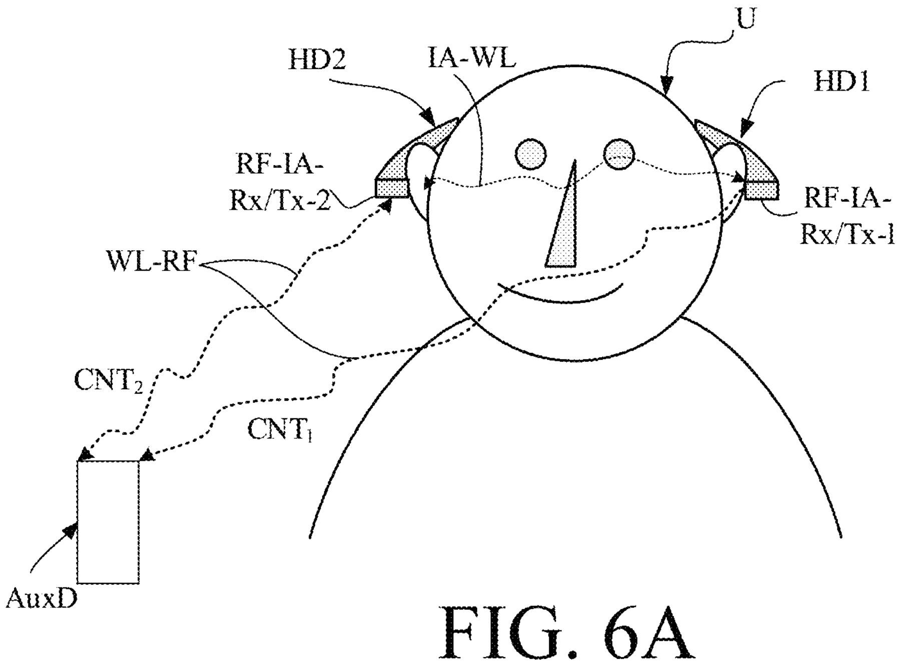
FIG. 6A shows an exemplary application scenario of an embodiment of a binaural hearing system according to the present disclosure, the scenario comprising a user, a binaural hearing aid system and an auxiliary device.
Figure 6B:
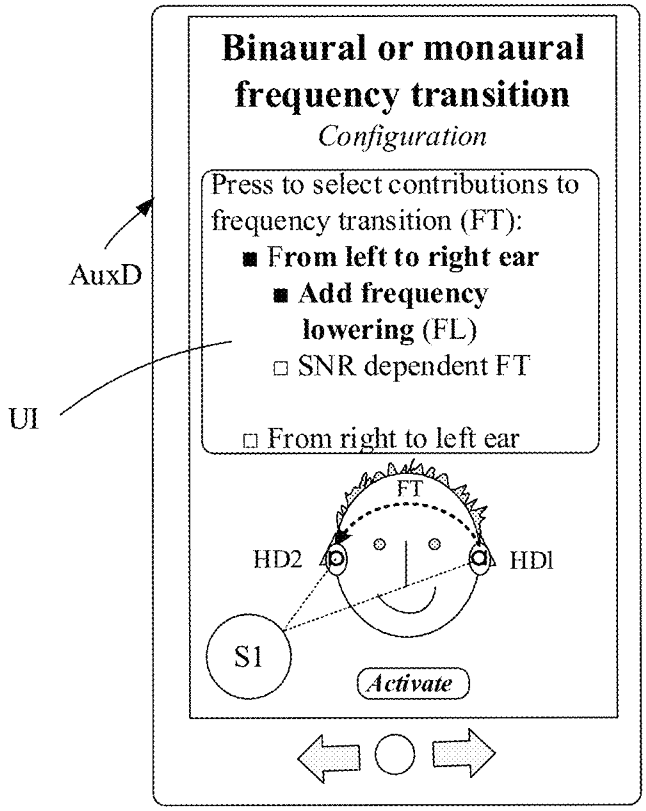
FIG. 6B illustrates the auxiliary device running an APP allowing a user to influence the function of the frequency transition feature described in the present disclosure.

FIGS. 6A and 6B illustrate an exemplary application scenario of an embodiment of a hearing system according to the present disclosure. FIG. 6A illustrates a user (U), a binaural hearing aid system and an auxiliary device (AuxD). FIG. 6B illustrates the auxiliary device (AuxD) running an APP for controlling the binaural hearing system (specifically the frequency transition feature). The APP is a non-transitory application (APP) comprising executable instructions configured to be executed on a processor of the auxiliary device (AuxD) to implement a user interface (UI) for the hearing system (including hearing devices (HD1, HD2)). In the illustrated embodiment, the APP is configured to run on a smartphone, or on another portable device allowing communication with the hearing system. In an embodiment, the binaural hearing aid system comprises the auxiliary device AuxD (and the user interface UI). In the embodiment of FIG. 6A, 6B, the auxiliary device AuxD comprising the user interface UI is adapted for being held in a hand of a user (U) and otherwise carried by the user, e.g. in a pocket or the like.

In FIG. 6A, wireless links denoted IA-WL (e.g. an inductive link between the left and right hearing devices, cf. also FIGS. 1A, 1B, 2A, 2B, 2C, 3A, 3B) and WL-RF (e.g. RF-links (e.g. based on Bluetooth or some other standardized or proprietary scheme) between the auxiliary device AuxD and the left hearing device HD1, and between the auxiliary device AuxD and the right hearing device HD2, respectively) are implemented in the devices (HD1, HD2) by corresponding antenna and transceiver circuitry (indicated in FIG. 6A in the left and right hearing devices as RF-IA-Rx/Tx-1 and RF-IA-Rx/Tx-2, respectively). The wireless links are configured to allow an exchange of audio signals and/or information or control signals (including filtered signals comprising at least a part of the bandwidth of an audio signal, and data related to audio signals, e.g. level estimates, SNRs, gains, etc.) between the hearing devices (HD1, HD2) and between the hearing devices (HD1, HD2) and the auxiliary device (AuxD) (cf. signals $CNT_1$, $CNT_2$).

FIG. 6B illustrates the auxiliary device (AuxD) running an APP allowing a user to influence the function of the frequency transition feature of the binaural hearing system. A screen of the exemplary user interface (UI) of the auxiliary device (AuxD) is shown in FIG. 6B. The user interface comprises a display (e.g. a touch sensitive display) displaying a user of the hearing system comprising first and second hearing devices, e.g. hearing aids, (HD1, HD2) in an exemplary sound source environment comprising a sound source (S1). In the framed box in the center of the screen, a number of possible choices defining the configuration of the frequency transition feature of the system are shown. Via the display of the user interface (under the heading Binaural or monaural frequency transition. Configuration), the user (U) is instructed to Press to configure and select contributions to frequency transition (FT):

From left to right ear
  Add frequency lowering (FL)
  SNR dependent FT
From right to left ear The user should press Activate to initiate the selected configuration.

These instructions should prompt the user to select between a Binaural or a Monaural frequency transition (i.e. whether filtered frequency content should be transferred (crossed) from/to both hearing devices (binaural FT) or whether filtered frequency content should be transferred only from one hearing device to the other (monaural FT)). The filled square and bold face writing indicates that the user has selected frequency transition From left to right ear (hearing device) including Frequency lowering (FL), where—in addition to frequency transition from left to right—high frequency content is also made available in the left hearing device (HD1) in a frequency range where the user has a suitable hearing ability (at least to perceive the sound as processed (amplified) by the hearing device. When the frequency transition feature has been configured, activation of the selected combination can be initiated by pressing Activate.

The user interface (UI) may e.g. be configured to allow the user to configure the filter(s) of the first (and possibly second) hearing devices, e.g. to select frequency bands to be transferred to the other hearing device (and/or frequency lowered in the same hearing device).

The user interface (UI) may e.g. be configured to allow the user to configure the weighting of the local signal with the signal received from the other hearing device of the hearing system (cf. e.g. weights $w_{x1}$, $w_{x2}$, x=1, 2, in FIG. 3B or weights $w_{11}$, $w_{22}$ in FIG. 2C).

The user interface (UI) may e.g. be configured to allow the user to indicate a direction to (or a location of) a target signal source relative to the user.

Other screens of the APP (or other APPs or functionality are accessible via activation elements (arrows and circle) in the bottom part of the auxiliary device.

Figure 7A:
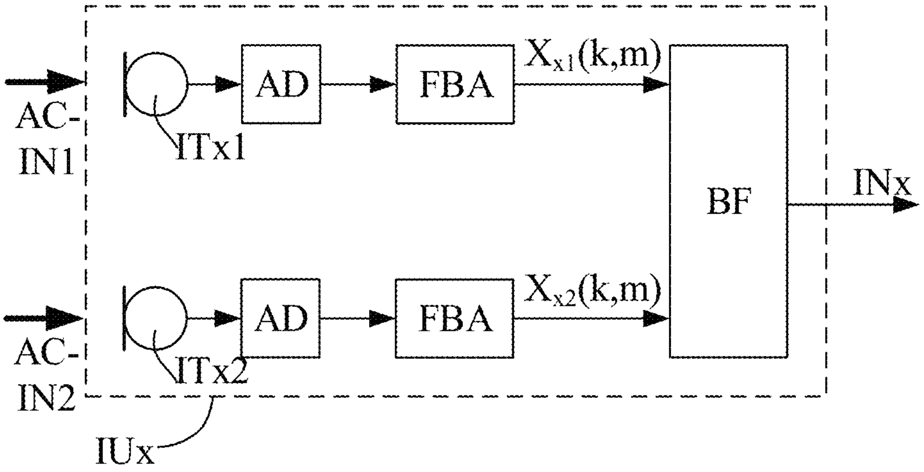
FIG. 7A shows a first embodiment of an input unit according to the present disclosure.

FIG. 7A shows a first embodiment of an input unit (IUx, x=1, 2) according to the present disclosure. The input unit comprises two input transducers (ITx1, ITx2, x=1, 2), here microphones, for providing respective electric signals comprising sound at the location of the input transducer in question. Additional input transducers may be included in the input unit and contribute to the provision of the first electric input signal INx. The input unit further comprises first and second analogue to digital conversion units (AD) for providing the respective electric signals as digitized signals. The input unit further comprises first and second analysis filter banks (FBA) for providing the digitized electric (microphone) signals as frequency sub-band signals $X_{x1}(k,m)$ and $X_{x2}(k,m)$, respectively, k and m being frequency and time (frame) indices respectively. In the embodiment of FIG. 7A the input unit comprises a beamformer filter (spatial filter) providing a beamformed (spatially filtered) signal in depndentce of the electric signals ($X_{x1}(k,m)$, $X_{x2}(k,m)$). The output of the beamformer (the beamformed signal) provides the output (INx) of the input unit (IUx), i.e., the electric input signal (INx) representing sound in the environment of the hearing device in question. Thereby the electric input signal (INx) has been spatially filtered (is focused on a target signal) and thus comprises fewer sound components considered to be of minor importance to the user ('noise') than the original electric signals from the respective input transducers.

Figure 7B:
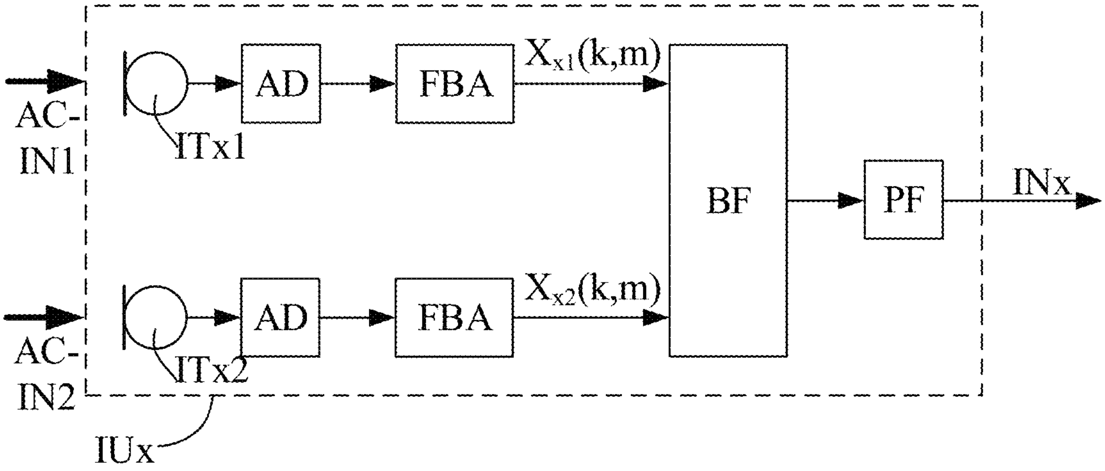
FIG. 7B shows a second embodiment of an input unit according to the present disclosure.

FIG. 7B shows an embodiment of an input unit (IUx) according to the present disclosure, which is similar to the embodiment of FIG. 7A, but which additionally comprises a postfilter (PF) for further reducing noise in the beamformed signal. The output of the postfilter (PF) provides the output (INx) of the input unit (IUx), i.e., the electric input signal (INx) representing sound in the environment of the hearing device in question.

Figure 7C:
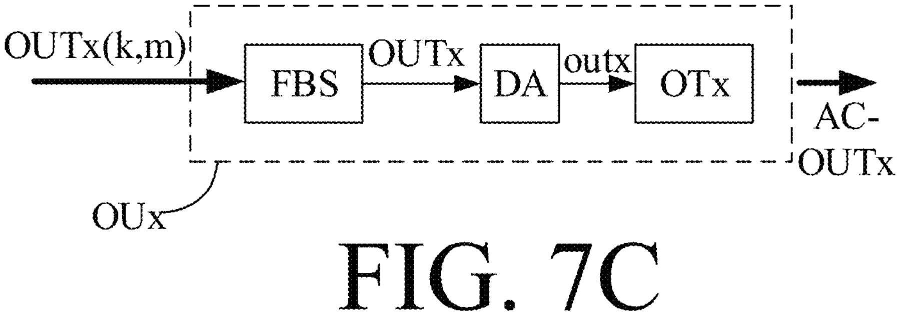
FIG. 7C shows an embodiment of an output unit according to the present disclosure.

FIG. 7C shows an embodiment of an output unit (OUx, x=1, 2) according to the present disclosure. The output unit comprises a synthesis filter bank (FBS) for converting a frequency sub-band signal OUTx(k,m) to a time-domain output signal OUTx, and a digital to analogue conversion unit (DA) for converting the digitized time-domain signal OTx to an analogue output signal outx. The analogue output signal outx is fed to output transducer (OTx) for converting the output signal outx to an output sound signal AC-OUTx (e.g. air-borne or bone-conducted sound).

The input units of FIG. 7A, 7B and the output unit of FIG. 7C may be used as input and output units, respectively, in the hearing devices according to the present disclosure.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

US20170127200A1 (Oticon, Bernafon) Apr. 5, 2017

The invention claimed is:

1. A hearing system comprising first and second hearing devices adapted for being located at first and second ears of a user, or for being fully or partially implanted in the head at said left and right ears of the user,
- the first hearing device comprising
  - a forward path comprising
    - a first input unit for converting a sound at said first hearing device to a first electric input signal comprising said sound;
    - a first processor for processing said first electric input signal, or a signal originating therefrom, and providing a first processed signal in dependence of a reduced hearing ability of the user at said first ear;
    - a first output unit adapted for providing stimuli perceivable as sound for the user at said first ear based on said first processed signal;
  - an analysis path comprising
    - a first filter for filtering said first electric input signal, the first filter being a low-pass filter allowing frequencies below an LP-cut-off frequency or a band-pass filter allowing frequencies between first and second cut-off frequencies, to pass the filter and providing a first filtered signal in dependence of the reduced hearing ability of the user at said first ear;
    - a first transmitter configured to allow transmission of said first filtered signal to the second hearing device;
- the second hearing device comprising
  - a second receiver configured to allow reception of said first filtered signal from the first hearing device;
  - a second output unit adapted for providing stimuli perceivable as sound for the user at said second ear comprising said first filtered signal or a processed version thereof;
- wherein the first hearing device comprises a first signal quality estimator configured to provide an estimate of a signal quality of the first electric input signal, or of a signal derived therefrom; and
- wherein the first hearing device further comprises a controller providing a control signal for controlling the first transmitter in dependence of the estimate of a signal quality from the first signal quality estimator.

2. A hearing system according to claim 1 wherein the second hearing device comprises a ventilation channel, or is configured as an open fitting, allowing sound from the environment to reach the ear-drum of the user.

3. A hearing system according to claim 1 wherein the first input unit comprises
- at least two input transducers for providing respective at least two electric input signals,
- and a first beamformer filter for providing said first electric input signal as a beamformed signal in dependence of said at least two electric input signals.

4. A hearing system according to claim 1 wherein the second hearing device further comprises
- a second input unit input for converting a sound at said second hearing device to a second electric input signal comprising said sound,
- a second combination unit for providing a second combined signal comprising said second electric input signal and said first filtered signal;
- wherein the second hearing device is configured to allow said second output unit to provide said stimuli perceivable as sound for the user at said second ear based on said second combined signal or a processed version thereof.

5. A hearing system according to claim 4 comprising a second processor for processing said combined signal and providing a second processed signal in dependence of a reduced hearing ability of the user at said second ear.

6. A hearing system according to claim 4 wherein the first and or second hearing device comprises
- a signal quality estimator for providing an estimate of a signal quality of the first and/or second electric input signals and/or of filtered versions thereof, and
- a controller for estimating respective weights to be applied to an electric input signal of the hearing device in question and to a filtered electric input signal received from the other hearing device via the wireless link.

7. A hearing system according to claim 1 wherein the second hearing device comprises
- a second filter for filtering said second electric input signal and providing a second filtered signal in dependence of a reduced hearing ability of the user at said second ear;
- a second transmitter configured to allow transmission of said second filtered signal to the first hearing device;
- wherein the first hearing device comprises
- a first receiver configured to allow reception of said second filtered signal from the second hearing device;
- a first combination unit configured to provide a first combined signal comprising said first electric input signal and said second filtered signal and to feed said first combined signal or a signal originating therefrom to said first processor.

8. A hearing system according to claim 1 wherein said first and second hearing devices are constituted by or comprises first and second hearing aids, a pair of earphones, an ear protection device or a combination thereof.

9. A hearing system according to claim 1 comprising a user interface allowing a user to control functionality of the hearing system.

10. Use of a hearing system as claimed in claim 1.

11. A method of operating a hearing system comprising first and second hearing devices adapted for being located at first and second ears of a user, or for being fully or partially implanted in the head at said left and right ears of the user, the method comprising in the first hearing device:

converting a sound at said first hearing device to a first electric input signal comprising said sound;

processing said first electric input signal, or a signal originating therefrom, and providing a first processed signal in dependence of a reduced hearing ability of the user at said first ear;

providing stimuli perceivable as sound for the user at said first ear based on said first processed signal;

filtering said first electric input signal such that frequencies below an LP-cut-off frequency or frequencies between first and second cut-off frequencies are passed and providing a first filtered signal in dependence of the reduced hearing ability of the user at said first ear;

transmitting of said first filtered signal to the second hearing device;

in the second hearing device receiving said first filtered signal from the first hearing device;

providing stimuli perceivable as sound for the user at said second ear comprising said first filtered signal or a processed version thereof;

wherein the first hearing device provides an estimate of a signal quality of the first electric input signal, or of a signal derived therefrom; and wherein the first hearing device further provides a control signal for controlling the transmitting of said first filtered signal in dependence of the estimate of a signal quality.

12. A hearing device adapted for being located at a first ear of a user, or for being fully or partially implanted in the head at said first ear of the user, the hearing device comprising a forward path comprising an input unit for converting a sound at said hearing device to an electric input signal comprising said sound;

a processor for processing said electric input signal, or a signal originating therefrom, and providing a processed signal in dependence of a reduced hearing ability of the user at said first ear;

an output unit adapted for providing stimuli perceivable as sound for the user at said first ear based on said processed signal;

an analysis path comprising a filter for filtering said electric input signal, the filter allowing frequencies, reflecting frequencies above, below, or between which the user has no or little hearing ability in said first ear, to pass the filter and providing a filtered signal in dependence of the reduced hearing ability of the user at said first ear;

a transmitter configured to allow transmission of said filtered signal to a second hearing device for providing stimuli perceivable as sound for the user at a second ear of the user comprising said filtered signal or a processed version thereof;

wherein the hearing device further comprises a signal quality estimator configured to provide an estimate of a signal quality of the electric input signal, or of a signal derived therefrom; and wherein the hearing device further comprises a controller providing a control signal for controlling the transmitter in dependence of the estimate of a signal quality from the signal quality estimator.

* * * * *